United States Patent
Roman

(10) Patent No.: US 10,927,897 B2
(45) Date of Patent: Feb. 23, 2021

(54) METHOD AND APPARATUS FOR A ROLLING BEARING ASSEMBLY WITH ELECTRICAL DISCHARGE DAMAGE PROTECTION

(71) Applicant: Illinois Tool Works Inc., Glenview, IL (US)

(72) Inventor: Matthew Roman, Mechanic Falls, ME (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/558,880

(22) Filed: Sep. 3, 2019

(65) Prior Publication Data

US 2020/0072288 A1 Mar. 5, 2020

Related U.S. Application Data

(60) Provisional application No. 62/726,871, filed on Sep. 4, 2018.

(51) Int. Cl.
| | |
|---|---|
| *F16C 19/52* | (2006.01) |
| *F16C 41/00* | (2006.01) |
| *F16C 33/78* | (2006.01) |
| *F16C 19/06* | (2006.01) |

(52) U.S. Cl.
CPC ............ *F16C 41/002* (2013.01); *F16C 19/06* (2013.01); *F16C 33/7816* (2013.01)

(58) Field of Classification Search
CPC ......... F16C 19/06; F16C 19/52; F16C 41/002
See application file for complete search history.

(56) References Cited

U.S. PATENT DOCUMENTS

| | | | |
|---|---|---|---|
| 822,723 | A | 6/1906 | Conrad |
| 7,136,271 | B2* | 11/2006 | Oh .............................. H05F 3/02 361/221 |
| 9,175,728 | B2 | 11/2015 | White |
| 9,464,672 | B2 | 10/2016 | White |
| 9,581,203 | B2* | 2/2017 | White ..................... F16C 33/62 |

(Continued)

FOREIGN PATENT DOCUMENTS

| | | |
|---|---|---|
| DE | 29916854 | 1/2000 |
| DE | 102016010926 | 9/2017 |

(Continued)

OTHER PUBLICATIONS

Int'l Search Report and Written Opinion Appln No. PCT/US2019/049513 dated Apr. 20, 2020.

*Primary Examiner* — Phillip A Johnson
(74) *Attorney, Agent, or Firm* — McAndrews, Held & Malloy, Ltd.

(57) ABSTRACT

A bearing assembly comprises an inner ring comprising an inner ring raceway, an outer ring comprising an outer ring raceway, rolling elements configured to roll or rotate between the inner ring raceway and the outer ring raceway, at least one electrically conductive part with a first end and a second end, and a seal coupled to the at least one electrically conductive part. The seal is configured to directly contact only one of the inner ring or the outer ring. The first end is configured to electrically contact one of the inner ring and the outer ring and the second end is configured to electrically contact the other of the inner ring and the outer ring.

20 Claims, 5 Drawing Sheets

(56) References Cited

U.S. PATENT DOCUMENTS

| | | | |
|---|---|---|---|
| 9,790,995 B2 | 10/2017 | White | |
| 10,190,640 B2 | 1/2019 | Hutchison | |
| 10,253,815 B2 | 4/2019 | Hart | |
| 10,253,818 B1 * | 4/2019 | Ince | F16C 41/002 |
| 2006/0007609 A1 * | 1/2006 | Oh | H02K 11/40 361/23 |
| 2014/0334758 A1 | 11/2014 | White | |

FOREIGN PATENT DOCUMENTS

| | | | |
|---|---|---|---|
| JP | 2001153145 | 6/2001 | |
| JP | 2008286229 A * | 11/2008 | F16C 33/7886 |
| JP | 2009079643 | 4/2009 | |

* cited by examiner

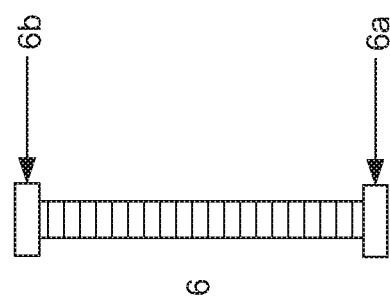
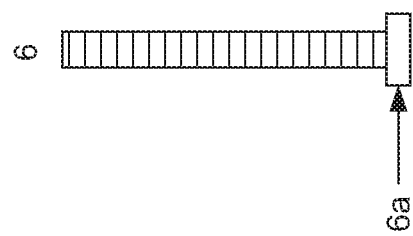
FIG. 4A
FIG. 4B
FIG. 4C

METHOD AND APPARATUS FOR A ROLLING BEARING ASSEMBLY WITH ELECTRICAL DISCHARGE DAMAGE PROTECTION

CLAIM OF PRIORITY

This patent application makes reference to, claims priority to and claims benefit from U.S. Provisional Patent Application Ser. No. 62/726,871, filed on Sep. 4, 2018. The above identified application is hereby incorporated herein by reference in its entirety.

BACKGROUND

The present disclosure relates to electrical discharge damage remediation, and more particularly, to a method and apparatus for a rolling bearing assembly with electrical discharge damage protection.

Limitations and disadvantages of conventional approaches will become apparent to one of skill in the art, through comparison of such approaches with some aspects of the present method and system set forth in the remainder of this disclosure with reference to the drawings.

SUMMARY

Methods and systems are provided for a rolling bearing assembly with electrical discharge damage protection, substantially as illustrated by and described in connection with at least one of the figures, as set forth more completely in the claims.

BRIEF DESCRIPTION OF THE DRAWINGS

These and/or other aspects will become apparent and more readily appreciated from the following description of the exemplary embodiments, taken in conjunction with the accompanying drawings.

FIGS. 4A, 4B, and 4C illustrate example sealing lips, in accordance with aspects of this disclosure.

DETAILED DESCRIPTION

Generally, a rolling bearing assembly may be used to allow smoother rotations of a rotor in, for example, an electric motor. However, voltages may be created on motor shafts, and the built-up voltages can discharge through the bearings. Discharging voltages can damage the rolling bearings such that over time the rolling bearing assembly will need to be replaced for continued operation of the motor.

Various embodiments of the disclosure describe a rolling bearing assembly with electrical discharge damage protection.

Figure 1:
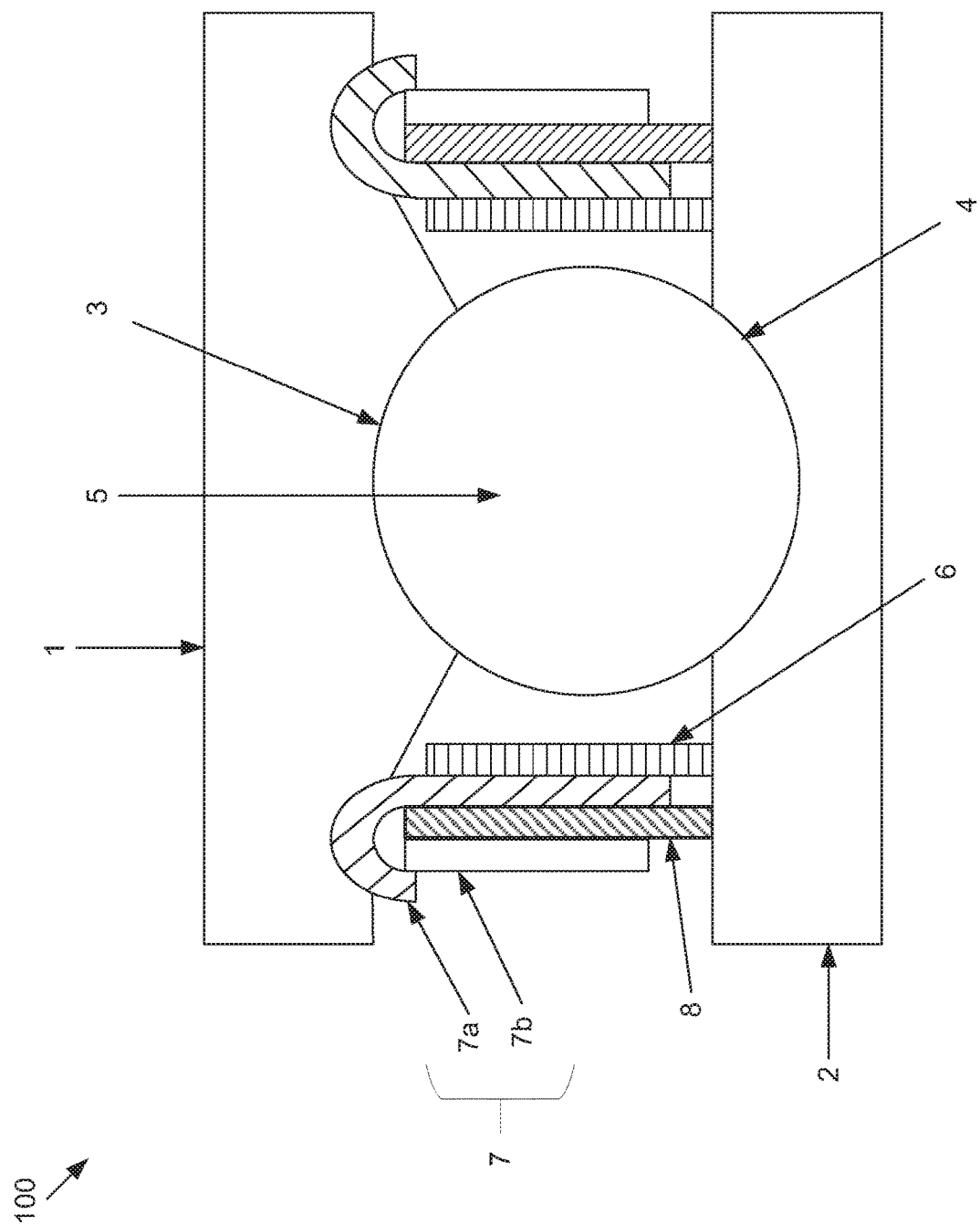
FIG. 1 illustrates a cross-section view of a rolling bearing assembly with electrical discharge damage protection, in accordance with aspects of this disclosure.

FIG. 1 illustrates a cross-section view of a rolling bearing assembly with electrical discharge damage protection. Referring to FIG. 1, there is shown a cross-section of a rolling bearing assembly 100 that is circular (or ring shaped). The cross-section view is of the top of the circular rolling bearing assembly 100. Accordingly, a shaft (not shown) extending horizontally across the page may be below the shown cross-section. A similar cross-section (not shown) of the bottom of the circular rolling bearing assembly 100 would be below the shaft. Therefore, if the shaft and the bottom cross-section are included in the drawing, a top of the shaft is in contact with the inner ring 2 of the shown cross-section of the top part and the bottom of the shaft is in contact with inner ring 2 of the cross-section of the bottom part. Note that the inner ring of the bottom part would be above the outer ring of the bottom part. Therefore, the shaft would be encircled by the inner ring 2.

A rolling bearing assembly 100 with electrical discharge damage protection comprises an inner ring 2 and an outer ring 1, where the inner ring includes an inner ring raceway 4 and the outer ring includes an outer ring raceway 3. The rolling bearing assembly 100 includes a plurality of rolling elements 5, where the plurality of rolling elements 5 are supported to roll on the inner ring raceway 4 and/or the inner outer ring raceway 3. At times the rolling elements 5 may contact both the ring raceway 4 and the outer ring raceway 3. At other times the rolling elements 5 may contact only one of the inner ring raceway 4 or the outer ring raceway 3. This may depend, for example, on the load and the location of the load on the rolling bearing assembly 100. The rolling elements 5 may be of different appropriate shapes for different example rolling bearing assembly 100. For example, the rolling bearing elements 5 may be spherical, cylindrical, or other appropriate shapes.

Figure 3A:
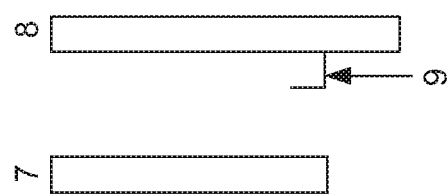
FIGS. 3A and 3B illustrate example caps for coupling conductive brush filaments onto an electrically conductive part, in accordance with aspects of this disclosure.
Figure 3B:
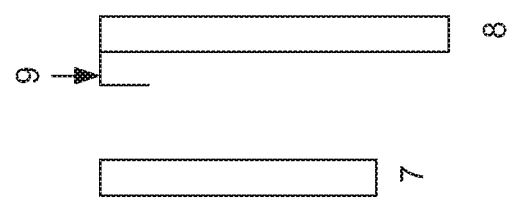

The rolling bearing assembly 100 may further include at least one electrically conductive part 7 including a first end that contacts one of the inner ring 2 or the outer ring 1. The electrically part 7 may have a shape of, for example, a ring. Electrically conductive brush filaments 8 may be fixed to the at least one electrically conductive part 7, where the brush filaments 8 contact the inner ring 2 or the outer ring 1 opposite that which the electrically conductive part(s) 7 contacts. The brush filaments 8 may be coupled to the electrically conductive part 7 via a cap 9 as shown in FIGS. 3A and 3B. While the term "filaments" is used for ease of application, it should be understood that "filaments" may refer to a single filament or multiple filaments.

Figure 2:
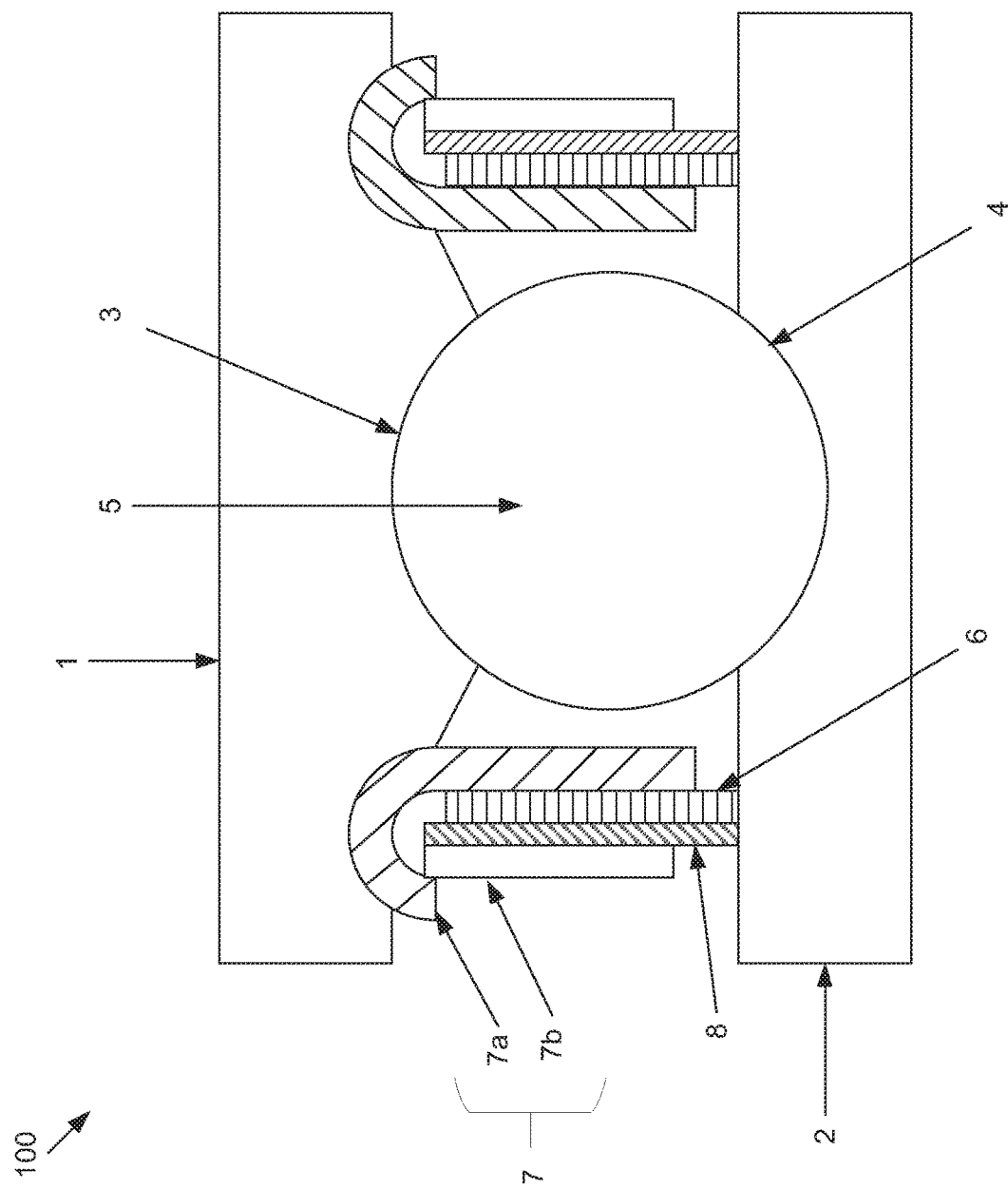
FIG. 2 illustrates a cross-section view of a rolling bearing assembly with electrical discharge damage protection, in accordance with aspects of this disclosure.

As shown in FIGS. 1 and 2, the electrically conductive part 7 may comprise two parts, the first part 7a and the second part 7b. Some examples of the disclosure may have only the first part 7a of the electrically conductive part 7. The filaments 8 may be, for example, held between the first part 7a and the second part 7b.

The rolling bearing assembly 100 may also include a seal 6 that is integrally connected to the at least one electrically conductive part 7 that may contact the same inner ring 2 or outer ring 1 as the brush filaments 8. Other examples may have the seal 6 that may contact the both the inner ring 2 or the outer ring 1, or one of the inner ring 2 or the outer ring 1 that the brush filaments 8 do not touch.

FIGS. 1 and 2 show one seal 6 coupled to only one side of the electrically conductive part 7. However, various examples may allow a plurality of seals 6, with one or more seals 6 coupled to one or both sides of the electrically conductive part 7. The seal 6 are shown to be between the filaments 8 and the rolling elements 5. In FIG. 1, the seal 6 is shown to be between the rolling elements 5 and the first part 7a of the electrically conductive part 7.

Accordingly, as shown, there may be an electrical path between the inner ring 2 and the outer ring 1 such that voltage at the motor shaft can be dissipated without damaging the rolling elements 5.

While the electrically conductive part 7 is shown as substantially U-shaped with the two parts that also form the legs of the electrically conductive part 7, various examples of the disclosure need not be so limited. For example, the electrically conductive part 7 may be a single piece whose cross-section is substantially U-shaped like, for example, a cotter pin or a hair pin where the filaments 8 is held between the legs of the cotter pin-like (or hair pin-like) electrically conductive part 7. Accordingly, various examples of the disclosure may use different configurations that allow for the filaments 8 to be held by the electrically conductive part 7.

The filaments 8 may be fastened (or coupled, attached, etc.) to the electrically conductive part 7 by one or many methods that are suitable for such a purpose. For example, the filaments 8 may be fastened to one or both of the first part 7a and the second part 7b by using an adhesive.

FIGS. 1 and 2 show the electrically conductive parts 7 on both sides of the rolling elements 5. However, other examples of the disclosure may have the electrically conductive part 7 on only one side of the rolling elements 5. In some examples of the disclosure, the electrically conductive part 7 may be in the shape of a ring, while in other examples of the disclosure the electrically conductive part 7 may not be a ring.

Figure 5:
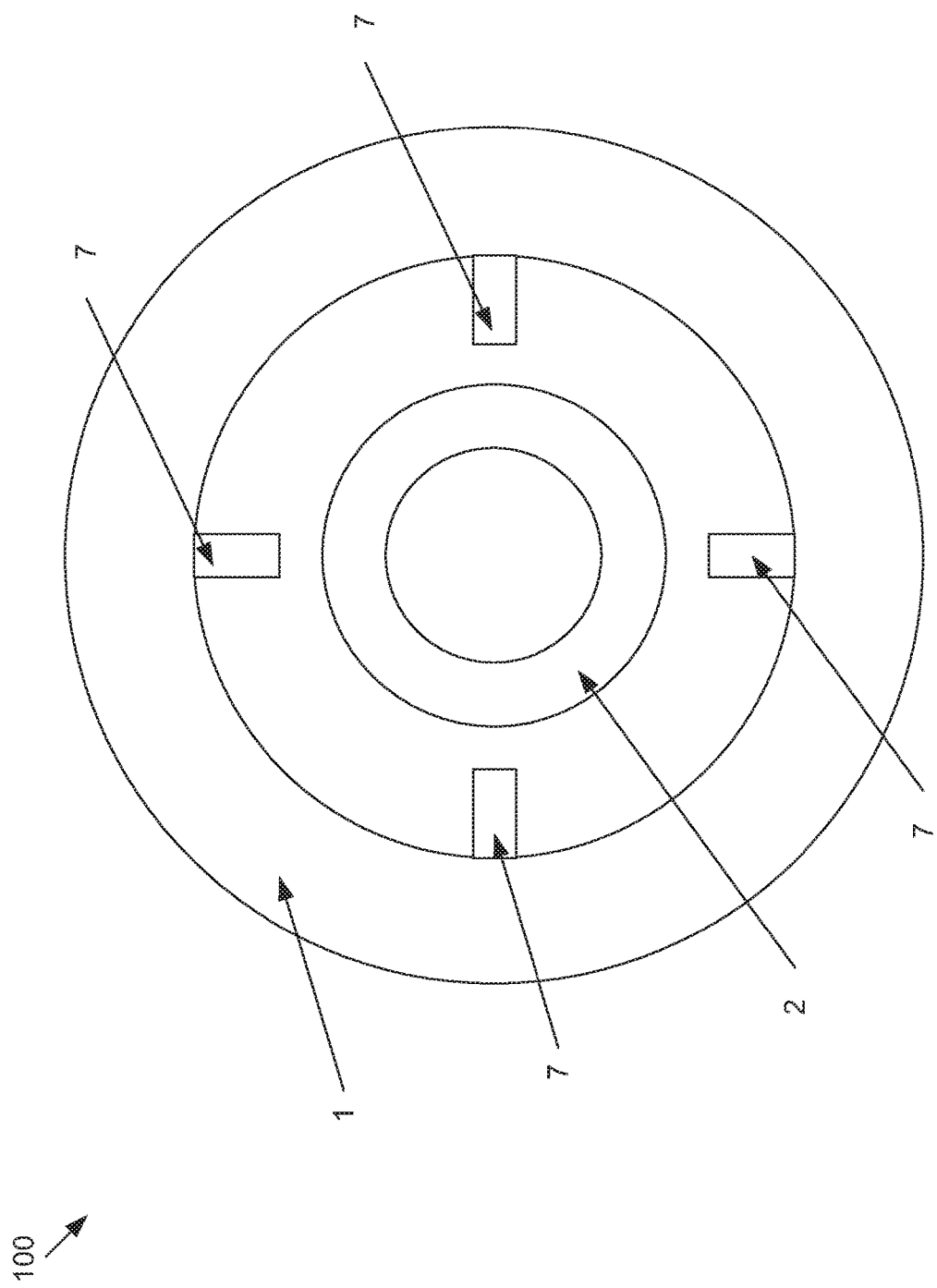
FIG. 5 illustrates a side view of a rolling bearing assembly with electrical discharge damage protection, in accordance with aspects of this disclosure.

For example, FIG. 5 illustrates a side view of the rolling bearing assembly 100. FIG. 5 shows the rolling bearing assembly 100 with the outer ring 1 and the inner ring 2, where the electrically conductive part 7 comprises at least one discrete part extending from one of the inner ring 2 or the outer ring 1, and where the at least one discrete part is not a ring and does not extend to the other of the inner ring 2 or the outer ring 1. For example, FIG. 5 shows 4 discrete electrically conductive parts 7 that extend from the outer ring 1 but does not reach the inner ring 2. These discrete electrically conductive parts 7 may have similar accessory parts such as the corresponding seals 6 and filaments 8. These discrete electrically conductive parts 7 may also comprise a first part 7a and a second part 7b.

While four discrete electrically conductive parts 7 are shown, various examples of disclosure may have one or more electrically discrete conductive parts 7. Additionally, the shape of the discrete electrically conductive parts 7 may be different than the example of rectangles shown in FIG. 5.

FIG. 2 illustrates a cross-section view of another rolling bearing assembly with electrical discharge damage protection. FIG. 2 is similar to FIG. 1 except that the seal 6 is next to the brush filaments 8 without an electrically conductive part 7 in between.

FIGS. 3A and 3B illustrate a cap 9 that may be a part of the filaments 8. The cap 9 may fit over, for example, an end of the electrically conductive part 7. Accordingly, the cap 9 may be configured such that the filaments 8 may be attached to either end of the electrically conductive part 7. For example, the cap 9 may be attached to one of the ends of the second part 7b, or to a bottom end of the first part 7a. Depending on the shape and configuration of the electrically conductive part 7, the cap 9 may fit on different portions of the electrically conductive part 7. While it is referred to as a "cap," the cap 9 may also be configured to fit into, for example, a hole at an end of the electrically conductive part 7.

Whether the cap 9 fits over an end of the electrically conductive part 7, into an end of the electrically conductive part 7, or otherwise, the filaments 8 may be attached by using any appropriate method of attaching the filaments 8, via the cap 9, to the electrically conductive part 7.

Various items may be discussed as being "fastened," "attached," "fixed," or "coupled" to each other. This fixing/coupling may be permanently fixed or removably fixed. For example, permanently fixing/coupling two objects may be when separating the two objects is difficult or may result in one or both of the objects being damaged. Examples of permanently fixing may be adhesives that is not meant to be dissolved or loosened, mechanical fastening such as riveting, crimping, force fitting, welding, etc. Removably fixing/coupling may indicate that the two objects are intended to be taken apart such that they, or replacement parts, can be fixed/coupled again. For example, removably fixing/coupling may use adhesives that can be dissolved or loosened, or use mechanical fastening mechanisms such as screws, bolts, latches, hook and loop fasteners, etc. It may be noted that a fastening process may be considered to be permanent or removable depending on the amount of effort needed to remove and to couple.

Some examples of mechanical fastening, without regard to whether the fastening is removable or permanent, or whether any may apply to an example of the disclosure, may include crimping, staking, riveting, pressing (or interference fit), using screws/bolts, using hook and loop fasteners, latches, applying force by tension or compression, etc. or other technologies that may be useful in devices such as bearing assemblies described herein.

FIGS. 4A, 4B, and 4C provide illustrations of lips at one or both ends of the seal 6. In FIG. 4A, there is shown a lip 6a at a bottom end of the seal 6. In FIG. 4B, there is shown a lip 6b at a top end of the seal 6. In FIG. 4C, there are shown lips 6a and 6b at the bottom end of the seal 6 and the top end of the seal 6, respectively. The lips 6a and/or 6b may be flexible lips. The seal 6 may also be a flexible seal. In various aspects of the disclosure, the seal 6 may be made of similar material as the lips (6a, 6b) or different material.

Accordingly, it can be seen that this disclosure provides for a bearing assembly that may comprise, for example, an inner ring comprising an inner ring raceway, an outer ring comprising an outer ring raceway, and rolling elements configured to roll or rotate between the inner ring raceway and the outer ring raceway. The rolling elements may touch one or both of the inner ring raceway and the outer ring raceway at different times depending on loading on the bearing assembly at a specific time. The bearing assembly may also comprise at least one electrically conductive part with a first end and a second end, where the first end is configured to electrically contact one of the inner ring and the outer ring, and the second end is configured to electrically contact the other of the inner ring and the outer ring.

The bearing assembly may comprise a seal coupled to the at least one electrically conductive part, where the seal is configured to directly contact only one of the inner ring or the outer ring. The first end may be configured to electrically contact one of the inner ring and the outer ring, and the second end may be configured to electrically contact the other of the inner ring and the outer ring.

The bearing assembly may comprise electrically conductive brush filaments fixed to the first end, where the first end is configured to electrically contact one of the inner ring or the outer ring via the electrically conductive brush filaments. While "filaments" is used for ease of description, it should be understood that "filaments" in this disclosure can refer to a single filament or to multiple filaments.

The electrically conductive brush filaments may be removably fixed to the first end of the electrically conductive part. The electrically conductive brush filaments may be held by a part of a cap that couples to the first end. The cap may be configured, for example, to couple to the first end by either fitting over the first end or fitting into the first end.

The at least one electrically conductive part may comprise electrically conductive brush filaments that form the first end that electrically contacts one of the inner ring and the outer ring. The at least one electrically conductive part may also comprise, for example, a first part and a second part that are directly coupled together.

The electrically conductive brush filaments may be held by the first part and the second part to extend past the first end of the at least one electrically conductive part. Accordingly, the electrically conductive brush filaments may be held between the first part and the second part in some aspects of the disclosure. The at least one electrically conductive part may be, for example, substantially U-shaped and the first part and the second part may be legs of the at least one electrically conductive part.

The electrically conductive brush filaments may be fastened to the at least one electrically conductive part with an adhesive.

The seal may be coupled to only one side of the at least one electrically conductive part. The seal may comprise a sealing lip that contacts one of the inner ring or the outer ring that is directly contacted by the first end, or the seal may comprise a sealing lip that contacts one of the inner ring or the outer ring that is not directly contacted by the first end. The seal may also comprise a sealing lip that is a flexible sealing lip. In various aspects of the disclosure, the seal may be between the rolling elements and the at least one electrically conductive part.

The at least one electrically conductive part may comprise a first electrically conductive part and a second electrically conductive part on opposite sides of one of the rolling elements. Various aspects may disclose the electrically conductive part on only one side of one of the rolling elements.

The electrically conductive part, may be, for example, a conductive ring.

The at least one electrically conductive part may also be, for example, at least one discrete part extending from one of the inner ring or the outer ring, where the at least one discrete part is not a ring and does not extend to the other of the inner ring or the outer ring. The discrete pieces may be thought of as pillars for ease of description, although various aspects of the disclosure may have different shapes, including arcs. It may also be noted that since the inner ring and the outer ring move with respect to each other, the electrically conductive part may fix one end to one of the inner ring or the outer ring, while the other end may not be fixed.

It may also be seen that the present disclosure also provides for a rolling bearing assembly with electrical discharge damage protection that comprises an inner ring and an outer ring, the inner ring including an inner ring raceway and the outer ring including an outer ring raceway, a rolling assembly including a plurality of rolling elements, the plurality of rolling elements are supported to roll on the inner ring raceway and the outer ring raceway, and at least one electrically conductive ring including a first ring end that contacts one of the inner ring or outer ring.

The rolling bearing assembly may also comprise electrically conductive brush filaments fixed to the at least one electrically conductive ring, wherein the brush filaments contact the inner or outer ring opposite that which the electrically conductive ring contacts. The rolling bearing assembly may further comprise a seal that is integrally connected to the at least one electrically conductive ring with a flexible sealing lip that contacts a same one of the inner or outer ring as the brush filaments.

As utilized herein, "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What are claimed:

1. A bearing assembly, comprising:
   an inner ring comprising an inner ring raceway;
   an outer ring comprising an outer ring raceway;
   rolling elements configured to roll or rotate between the inner ring raceway and the outer ring raceway;
   at least one electrically conductive part with a first end and a second end, wherein the at least one electrically conductive part comprises a first part and a second part;
   a seal coupled to the at least one electrically conductive part; and
   electrically conductive brush filaments fixed to the at least one electrically conductive part between the first part and the second part,
   wherein:
   the seal is configured to directly contact only one of the inner ring or the outer ring, and the first end is configured to electrically contact one of the inner ring and the outer ring, and the second end is configured to electrically contact the other of the inner ring and the outer ring.

2. The bearing assembly of claim 1, wherein the first end is configured to electrically contact one of the inner ring or the outer ring via the electrically conductive brush filaments.

3. The bearing assembly of claim 2, wherein the electrically conductive brush filaments are removably fixed to the first end.

4. The bearing assembly of claim 1, wherein the electrically conductive brush filaments form the first end that electrically contacts one of the inner ring and the outer ring.

5. The bearing assembly of claim 1, wherein the the first part and the second part are directly coupled together.

6. The bearing assembly of claim 5, wherein electrically conductive brush filaments extend past the first end of the at least one electrically conductive part.

7. The bearing assembly of claim 5, wherein the at least one electrically conductive part is substantially U-shaped and the first part and the second part are legs of the at least one electrically conductive part.

8. The bearing assembly of claim 1, wherein electrically conductive brush filaments are secured to the at least one electrically conductive part with an adhesive.

9. The bearing assembly of claim 1, wherein the seal is coupled to only one side of the at least one electrically conductive part.

10. The bearing assembly of claim 1, wherein the seal comprises a sealing lip:
    that contacts one of the inner ring or the outer ring that is directly contacted by the first end; or
    that contacts one of the inner ring or the outer ring that is not directly contacted by the first end.

11. The bearing assembly of claim 1, wherein the seal comprises a sealing lip that is a flexible sealing lip.

12. The bearing assembly of claim 1, wherein the seal is between the rolling elements and the at least one electrically conductive part.

13. The bearing assembly of claim 1, wherein the at least one electrically conductive part is on only one side of one of the rolling elements.

14. The bearing assembly of claim 1, wherein the at least one electrically conductive part comprises one of:
    a conductive ring;
    a first electrically conductive part and a second electrically conductive part on opposite sides of one of the rolling elements; or
    at least one discrete part extending from one of the inner ring or the outer ring, wherein the at least one discrete part is not a ring and does not extend to the other of the inner ring or the outer ring.

15. A rolling bearing assembly with electrical discharge damage protection, comprising:
    an inner ring and an outer ring, the inner ring including an inner ring raceway and the outer ring including an outer ring raceway;
    a rolling assembly including a plurality of rolling elements, the plurality of rolling elements are supported to roll on the inner ring raceway and the outer ring raceway;
    at least one electrically conductive ring including a first ring end that contacts one of the inner ring or outer ring, wherein the at least one electrically conductive ring comprises a first part and a second part; and
    one or more electrically conductive brush filaments fixed to the at least one electrically conductive ring between the first part and the second part.

16. The rolling bearing assembly of claim 15, wherein the brush filaments contact the inner or outer ring opposite that which the electrically conductive ring contacts.

17. The rolling bearing assembly of claim 16, comprising a seal that is integrally connected to the at least one electrically conductive ring with a flexible sealing lip that contacts a same one of the inner or outer ring as the brush filaments.

18. A bearing assembly, comprising:
    an inner ring comprising an inner ring raceway;
    an outer ring comprising an outer ring raceway;
    rolling elements configured to roll or rotate between the inner ring raceway and the outer ring raceway;
    at least one electrically conductive part with a first end and a second end, wherein the first end is configured to electrically contact one of the inner ring and the outer ring, and the second end is configured to electrically contact the other of the inner ring and the outer ring; and
    a seal coupled to the at least one electrically conductive part, wherein the seal is configured to directly contact only one of the inner ring or the outer ring; and
    electrically conductive brush filaments fixed to the at least one electrically conductive part via a cap.

19. The bearing assembly of claim 18, wherein the cap is configured to couple to the first end by fitting over the first end.

20. The bearing assembly of claim 18, wherein the cap is configured to couple to the first end by fitting into the first end.

* * * * *